United States Patent [19]

Li et al.

[11] Patent Number: 5,436,905
[45] Date of Patent: Jul. 25, 1995

[54] GROUP RANDOMLY ADDRESSED POLLING MAC PROTOCOL FOR WIRELESS DATA

[75] Inventors: Meng-Che Li, Tainan; Kwang-Cheng Chen, Ping-Tung, both of Taiwan

[73] Assignee: Industrial Technology Research Institute, Hsinchu, Taiwan

[21] Appl. No.: 243,200

[22] Filed: May 16, 1994

[51] Int. Cl.⁶ ............................................. H04B 7/26
[52] U.S. Cl. .................... 370/95.2; 455/54.1; 340/825.08
[58] Field of Search ............... 370/95.2, 95.1; 379/58, 379/59, 60; 455/33.1, 33.2, 54.1, 54.2; 340/825.08

[56] References Cited

U.S. PATENT DOCUMENTS

| | | | |
|---|---|---|---|
| 4,667,193 | 5/1987 | Cotie et al. | 340/825.08 |
| 5,010,329 | 4/1991 | Nagakura | 340/825.08 |
| 5,053,883 | 10/1991 | Johnson | 340/825.08 X |
| 5,373,503 | 12/1994 | Chen | 370/95.2 X |

*Primary Examiner*—Douglas W. Olms
*Assistant Examiner*—Russell W. Blum
*Attorney, Agent, or Firm*—W. Wayne Lianh

[57] ABSTRACT

A method to provide improved medium access control (MAC) protocol for a wireless local area network (LAN) comprising the steps of: (a) pre-arranging a polling cycle to be broadcast from the base station into a sequence of broadcast groups, (b) assigning each active mobile node to a randomly chosen broadcast group, (c) performing a group randomly addressed polling for each of the broadcast groups, and (d) assigning uncollided mobile nodes to their original randomly chosen broadcast group address. The uncollided mobile nodes will also be given the privilege of keeping their random numbers as fixed random numbers, until they collide with other mobile node(s) in subsequent polling cycle(s). All the collided mobile nodes, all newly active mobiles, and all newly joined mobile nodes are subject to a new polling cycle. The method has shown to provide excellent throughput (better than 0.90), stable convergence, and excellent delay behavior.

7 Claims, 8 Drawing Sheets

GROUP RANDOMLY ADDRESSED POLLING MAC PROTOCOL FOR WIRELESS DATA

FIELD OF THE INVENTION

The present invention relates to a method to provide a medium access control protocol (MAC) for a wireless data network based on randomly addressed polling. More particularly, the present invention relates to a method which is based on a randomly addressed polling approach utilizing a sequence of broadcasting-randomly addressed polling cycles, to provide an improved medium access control protocol for wireless local area data network (LAN). The method disclosed in the present invention consists of one or more superframes (or broadcasting cycles), and each superframe consists of a plurality of randomly addressed polling "groups" (or sub-broadcasting cycles). In addition to providing good utilization of channels, transparency for multiple physical layer transmissions, and power efficiency for mobile nodes, the method disclosed in the present invention also delivers smooth converging and better throughput/delay performance, and can be practically implemented with relatively simple hardware.

BACKGROUND OF THE INVENTION

With the development of high performance portable personal computers and the necessity for networking among various computing machines, wireless local area network (LAN) has become an important emerging issue facing today's information industry. A successful implementation of the wireless LAN involves, among other things, a successful establishment of physical layer transmissions (PHY) through radio or infrared, and an effective as well as productive medium access control protocol (MAC).

Wireless LAN usually allows two types of realizations: infrastructured LANs and ad-hoc LANs. For most applications of wireless LANs, however, a certain kind of infrastructure is still required no matter if it is a radio LAN, or an IR (infrared) LAN. Such an infrastructure is typically a wired or wireless backbone, and the network traffic is divided into two directions: uplink (into the backbone) and downlink (from the network). The contact points for backbone with wireless medium (i.e., air) are called access points. The access points can be base stations or repeaters to enlarge the coverage of communication.

Due to the special feature of wireless LANs, a common channel is utilized to all access points and mobile nodes, and the downlink communication is typically achieved by broadcasting. On the other hand, uplink traffic generally needs a multiple access control protocol to handle the transmissions from all the active mobile nodes. There exist several reasons that make the uplink traffic difficult for wireless LANs. These include: (1) wireless LANs typically operate in very strong multipath fading channels which can change their characteristics in a very short time or in a very short distance (spatial domain); (2) the wireless medium is quite different from the cable and/or optical fiber medium, and many trivial implementations in wired medium, such as carrier sensing, are not so trivial for wireless medium; (3) wireless LANs are designed to serve mobile users who are expected to move around from one part of the network to another, and new users may be expected to join the LAN at any time and any place; and (4) wireless LANs may introduce spatial domain behavior due to the multicell structure, and a handoff must be properly handled Due to these difficulties, uplink access control protocol has become an important task for the MAC design of wireless LANs. An efficient and productive MAC protocol based on random access control is desired and indeed needed for wireless LANs since, as described before, new mobile nodes may join the network at any time or any place. An efficient random access protocol is also desired to serve new traffic into the network.

The IEEE project 802 has formed study group 802.11 to set up a new international wireless LAN standard. During the process of the IEEE 802.11 standards recommendation, 20 problematic areas (requirements) have been identified in selecting a decent MAC protocol. These include: throughput; delay; transparency to different PHY layers; ability to serve data, voice, and video (time bounded services); fairness of access; battery powered communication; maximum number of nodes; robustness with respect to collocated networks; ability to support handoff/roaming between service areas; establishment of peer-to-peer connectivity without prior knowledge; unauthorized network access impact on throughput; ability to support broadcast (multicast); critical delay which may limit large area coverage; MAC needs to enforce insensitivity to capture effects; support for priority traffic; ability to support non-reciprocal traffic; preservation of MSDU's order; ability to work in simple, small and large systems; implication on complexity of PHY; and ability to market and complexity. Regarding to throughput, with 10M bps physical transmission and over 80% throughput for CSMA/CD, Ethernet can deliver over 8M bps performance in principle. By comparison, only 3–3.5M bps performance is achieved for wireless LANs.

Many protocols based on token passing carrier sensing, and ALOHA, have been proposed for wireless LANs with infrastructure. They all present some difficulties to be considered an ideal solution for wireless LANs. Other protocols such as CDMA or B-CDMA are, in practice, hard to achieve for situations requiring high rate data transmissions, due to the limitations of available spectrum and the relatively rudimentary base stations of most LAN applications. More recently, a medium access control protocol based on randomly addressed polling was proposed by the coinventors of the present invention for multi-cell, high speed wireless networks. A performance analysis of their proposed protocol was provided in a publication entitled: "Performance Analysis of Randomly Addressed Polling". This paper was presented at the Fourth International Symposium n Person, Indoor and Mobile Radio Communications (PIMRC"93), Yokohama, Japan (Sep. 8–11, 1993). The content disclosed therein is hereby expressly incorporated by reference. Their proposed protocol, named "RAP" (which stands for randomly addressed polling), is a centralized MAC protocol with partial decentralized functions such as initiation of handoff. It is aimed at controlling up-link traffic during wireless LAN data communication between a base station and mobile nodes. The randomly addressed polling protocol developed by the co-inventors has been demonstrated to show good throughput and delay statistics, no handoff for data services, soft handoff for time-bounded services, fairness to access; is transparent to many widely used transmissions; and provides seamless service in multi-cell wireless networks as well as supports multi-cast function.

However, while the randomly addressed polling protocol has met many of the requirements for wireless LANs and appeared to be an attractive protocol for wireless networks, it has been observed that the delay in packet data transmission is very sensitive to the arrival rate when the arrival rate approaches the optimal rate, i.e., the delay associated with the protocol becomes unstable (jumps up and down) about the average delay. Furthermore, it was also observed that the randomly addressed polling protocol would suffer repeated collisions at a random address, when only a limited number of random addresses are provided and the number of active users (i.e., active mobile nodes) is large.

SUMMARY OF THE INVENTION

Having discussed the requirements of a medium access control protocol (MAC) for wireless LANs, and the disadvantages observed in the published methods, the primary object of the present invention is to develop a method based on randomly addressed polling which provides an improved medium access control protocol for a wireless local area data network. The method disclosed in the present invention provides improved throughput and delay performance, as well as stable convergence, and is thus an excellent candidate of MAC protocol for wireless LANs and other wireless network applications.

The present invention involves a semi-random grouping approach of mobile nodes and a semi-random addressed polling procedure to provide an improved multiple access control protocol for wireless LANs. The method disclosed in the present invention, which is particularly advantageous during the uplink of data transfer of a LAN (i.e., during the transfer of packets of data from a plurality of mobile nodes to the base station), comprises the following steps:

(a) prearranging a polling cycle to be broadcast (i.e., a broadcast cycle) from the base station into a sequence of Q broadcast groups, identified as groups 0 through Q-1, wherein Q is an integer, each broadcast group can be considered as a sub-polling cycle (i.e., a sub-broadcast cycle);

(b) assigning each and every mobile node, which intends to send at least a packet of data to the base station, to a randomly chosen broadcast group I, wherein I is an integer from 0 to Q-1;

(c) starting from broadcast group 0 through broadcast group (Q-1), performing a group randomly addressed polling as follows: within each broadcast group I, performing a randomly addressed polling procedure comprising the following steps:

(i) broadcasting a first broadcast message from the base station to all mobile nodes under its coverage, to signal a "ready to receive" at the base station from mobile node assigned to broadcast group I;

(ii) in each and every mobile node belonging to (i.e., assigned to) broadcast group I, except those mobile nodes that have been instructed to transmit a predetermined random number, generating a random number R, each of the random numbers being selected from a set of numbers ranging from 0 to P-1, wherein P is an integer greater than or equal to Q;

(iii) the mobile nodes belonging to broadcast group I simultaneously transmitting the random numbers Rs to the base station:

(iv) collecting the random numbers Rs, some of which may be in multiplicate, at the base station and separating the mobile nodes into collided nodes and uncollided nodes; collided nodes are those mobile nodes that transmitted the same random number as that from at least another node;

(v) the base station broadcasting the uncollided random numbers, one at a time, to the mobile nodes, and the mobile node whose random number is called will transmit the packet of data from the uncollided mobile nodes to the base station; this step is repeated until all the packets of data are transmitted from broadcast group I, or until a predetermined number of attempts are made for each unsuccessfully transmitted node;

(vi) assigning each of the uncollided mobile nodes to the randomly chosen broadcast group that it has been assigned to, each of the uncollided mobile nodes also keeping the same random address in subsequent steps;

(vii) repeating steps (c)(i) through (c)(vii) for all the broadcast groups;

(d) assigning each of the collided mobile nodes from the previous step and each of the newly joined mobile nodes to a randomly chosen broadcast group;

(e) performing a group randomly addressed polling by repeating steps (c)(i) through (c)(vii) for all the broadcast groups; and (f) repeating steps (d) and (e) if there exist collided mobile nodes and/or newly joined mobile nodes.

The method disclosed in the present invention can be considered as providing a superframe (i.e., a broadcasting superframe) structure, which consists of Q frames. Each superframe can be considered as a complete polling cycle, and each frame, which is considered as a sub-polling cycle, involves a randomly addressed polling ("RAP") procedure. The present invention provides a clear advantage over the straightforward RAP procedure in that not all the active nodes compete in one contention period. The old nodes which have successfully sent transmission(s) to the base station before a current cycle (i.e., a current superframe) contend according to their previous respective successful random group addresses (i.e., they get to keep the same broadcast group number). Those nodes, which have not been able to send transmission(s), as well as all newly joined nodes, are respectively assigned to a new random group address and they contend against other nodes within the same group address.

With the present invention, the choice of Q is not limited to be the same as P; further, it can be dynamically changed according to the system load. Because the present invention allows the up-link load to be equally spread among the Q groups during the polling cycle (i.e, within a superframe) the number of redundant collisions is greatly reduced. Step (c)(vi) provides that if users at different mobile nodes apply distinct addresses in the same group., those users will never collide with each other again. Collision only occurs when a newly active user chooses the identical random group address as does the user in the same group and both are ready to be polled at the same time. The present invention has shown to provide good throughput (around 90%), good delay, and excellent stability performance.

In situations where time-bounded services (such as voice) are supported by the network, those active nodes with time-bounded service packets can join any group for contention. To avoid possible congestion (i.e., too many packets in a superframe), time-bounded service packets may be dropped after certain delay if such action is tolerable, or may be scheduled for next (or later) superframes. With the continuously stable (bounded delay) throughput provided by the present invention, it is also an excellent communication protocol for use with future PDAs (personal digital assistants), where data and voice services are likely to be integrated together.

BRIEF DESCRIPTION OF THE DRAWINGS

The present invention will be described in detail with reference to the drawing showing the preferred embodiment of the present invention, wherein.

DETAILED DESCRIPTION OF THE PREFERRED EMBODIMENT

Figure 1:
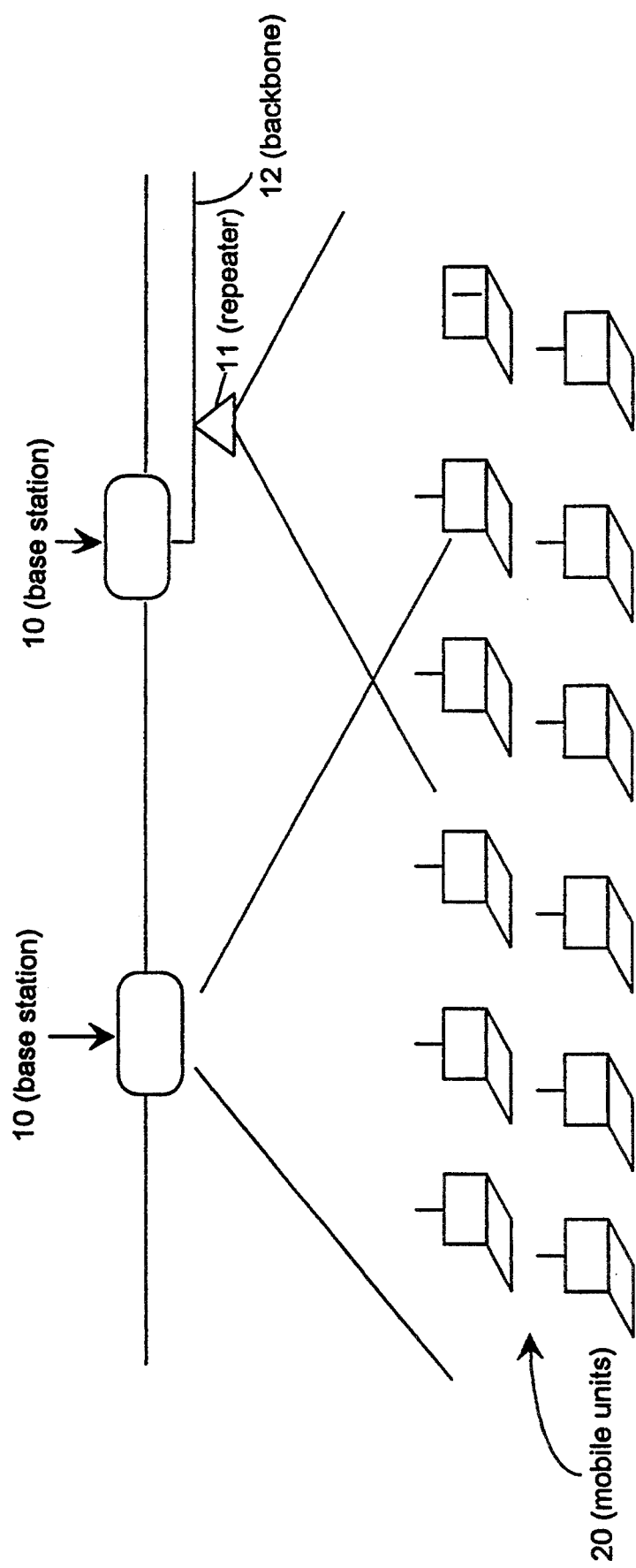
FIG. 1 is a schematic diagram of a wireless LAN containing a base station and a plurality of mobile nodes.

FIG. 1, which is a schematic diagram of an infrastructured wireless local area network (LAN), shows a base station 10 covering a plurality of mobile units 20. The LAN may be supplemented by repeaters 11, which are connected to the base station via a high speed backbone 12.

Figure 2:
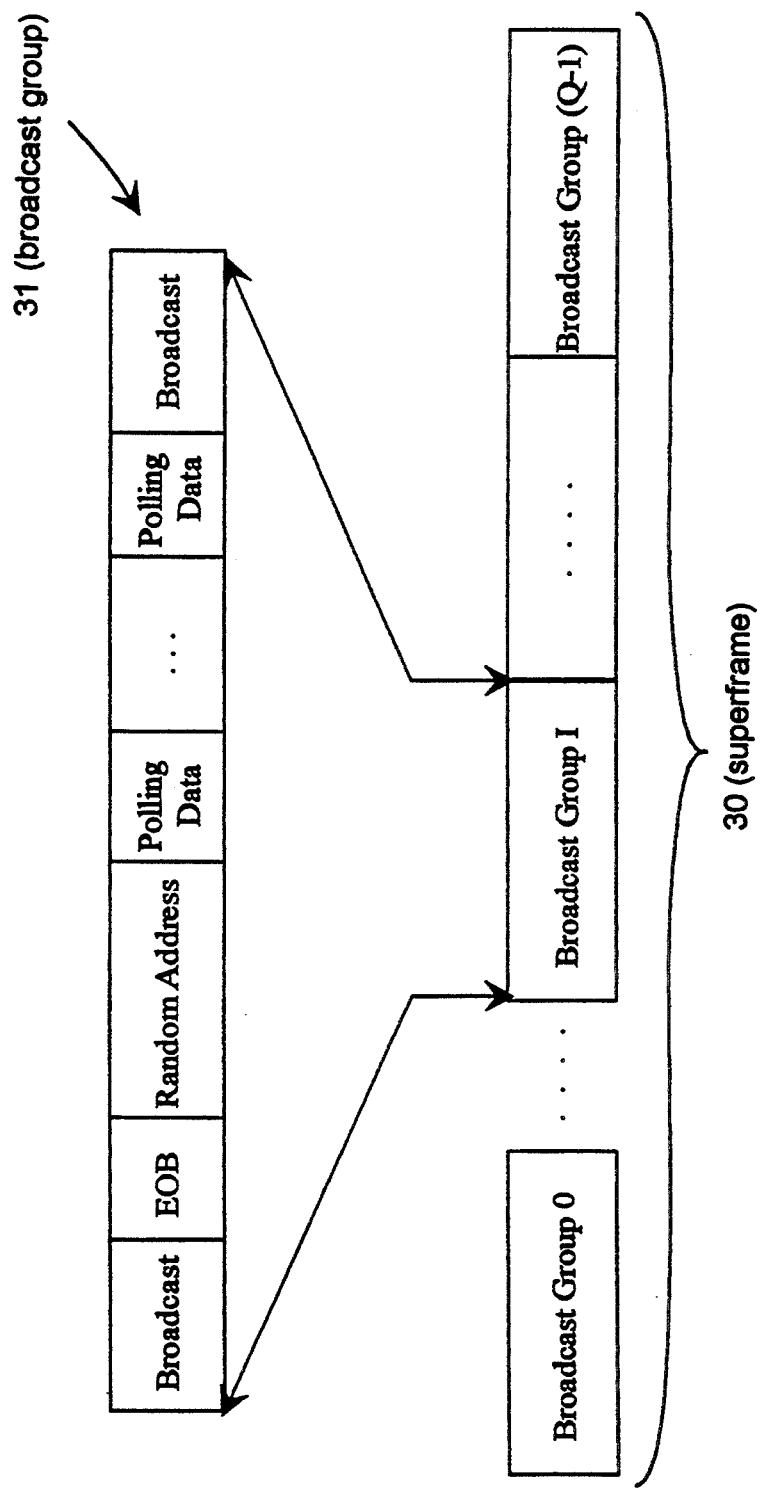
FIG. 2 is a schematic diagram describing the superframe structure of the method disclosed in the present invention.

The method disclosed in the present invention may be considered as having a superframe broadcasting structure, as shown in FIG. 2. Each superframe 30 represents a complete polling cycle. The superframe 30 consists of Q sub-polling cycles, or the so-called broadcast groups 31, ranging from Group 0 through Group (Q-1) in a continuous and sequential manner. Each broadcast group consists of the following steps:

Step 1: The base station sends a ready message and the address 'I' of the broadcast group that is to be polled, I is an integer from 0 to (Q-1), to all the mobile nodes under its coverage.

Step 2: For each of the active mobile nodes assigned to the broadcast group I, that are intending to transmit packet(s) of data to the base station, except those that have been designated a predetermined random number, it generates a random number from 0 to P-1, wherein P is an integer greater than or equal to Q. Those that have been designated a predetermined random number transmit such predetermined random numbers, respectively.

Step 3: All these active mobile nodes simultaneously transmit their own random numbers which are good only for one polling cycle (i.e., within one superframe). All these random numbers must be simultaneously transmitted orthogonally, for example, by orthogonal codes such as those for synchronous/asynchronous code division multiple access (CDMA), or by different frequency information. Furthermore, each active mobile node may generate random numbers L times, and/or in L stages. In general, each mobile node may transmit the random number more than once at each stage, and the base station may use majority-vote policy to decide the correctly transmitted random number. However, with an error-free transmission, only one transmission is adequate. If the base station cannot recognize certain random number(s), it will treat this situation as having no reception.

Step 4: The base station listens to all the multiple random numbers simultaneously and divides the mobile nodes into two groups: collided (with at least two nodes transmitting the same random number) and uncollided (the random numbers are distinct). Then one at a time, the base station broadcasts that it will receive data packet(s) from the mobile node corresponding to one of those uncollided random numbers. Each of the uncollided nodes then transmits data packet(s) stored in its buffer to the base station. After the base station successfully/unsuccessfully receives the packet from the mobile node, it sends a positive/negative acknowledge signal before polling the next number(s). If the mobile node receives a positive acknowledge signal, it removes the packet from its buffer. Otherwise, the mobile node(s) keep the packet(s) for future polling. A predetermined number of attempts can be allowed for each mobile note to transmit its packet(s) of data before it is determined unsuccessful.

One of the key elements of the method disclosed in the present invention is the construction of the superframe 30. All newly active mobile nodes and collision mobile nodes will be assigned to a randomly chosen group I, wherein I ranges from 0 to (Q-1). On the other hand, mobile nodes that have been successfully polled (i.e., with a distinct random address) would be able to keep their old group address until another user joins the same group and transmits the same random number. However, when a collision occurs involving a previously uncollided mobile node, the privilege to keep its existing group address and random number will be forfeited. This forces both mobile nodes to be respectively assigned to randomly chosen groups.

The principles of the present invention can be made more clear by examining the following illustrative example:

Illustrative Example: As shown in FIG. 1, mobile nodes A, B, C, D, E, F, G, I, J, and K are covered under the same coverage area of base station 1. Table 1 shows how the present invention works. In this illustrative example, the number of broadcast groups Q is determined to be 3, and the random addresses are chosen from a continuous group of integers from 0 to 4 (i.e., P=5).

During superframe 1, A, B, C, D, E, and F become active nodes. Each of the active nodes is randomly assigned to one of the three broadcast groups: $G_0$, $G_1$, and $G_2$, which also constitute the superframe. During broadcast group $G_0$, since A is the only active node, it becomes distinct. The base station then sends a "ready to receive" signal and the random number transmitted by A, which then transmits the packet(s) of data from its buffer. Since there is only one active node in group $G_0$, only one such transmission is necessary. After receiving a positive acknowledgement from the base station, mobile node A removes the packet(s) from its buffer. The process then moves into broadcast group $G_1$. During broadcast group $G_1$, the three mobile nodes B, C, and F transmit three random numbers, 2, 1, and 1, respectively. Node B is distinct; whereas, C and F collide with each other. The base station will broadcast B's random number to signal B to unload the packet of data from its buffer. The packets of data in C and F will be carried over to the next or later superframe.

During broadcast group $G_2$, D is distinct, again because it is the only active node belonging to group $G_2$. Data packet in D will be transmitted to base station. This completes the polling procedure in superframe 1. Since A, B and D have been successfully polled, they will maintain their group address as well as their respective random numbers.

During superframe 2, B and D become active again; C and F remain active because they were not successfully polled in the previous superframe (i.e., superframe 1); and G is newly active. Because B and D previously have been successful in unloading their packets, they remain in their respective old groups $G_1$ and $G_2$, respectively. Furthermore, B and D will transmit the same random numbers as they did in superframe 1. C, F, and G are randomly assigned to new groups $G_1$, $G_2$, and $G_0$, respectively. Random numbers are then respectively generated in the three mobile nodes C, F, and G, mobile nodes B and D get to keep and transmit their old random numbers, and the results are shown in Table 1.

Table 1 provides illustrative results for a total of seven superframes to explain the address assignment and polling steps involved in the present invention. In Table 1, the numeral inside the parenthesis, for example the number 0 in A(0), indicates the group number, or the address of the broadcast group. The numeral after the slash, for example the number 3 in A/3, indicates the random number to be transmitted by mobile node (i.e., user).

delay performance. These aspects are illustrated by the examples that follow.

The present invention will now be described more specifically with reference to the following examples. It is to be noted that the following descriptions of examples, including the preferred embodiment of this invention, are presented herein for purposes of illustration and description and are not intended to be exhaustive or to limit the invention to the precise form disclosed.

EXAMPLE 1

Figure 3:
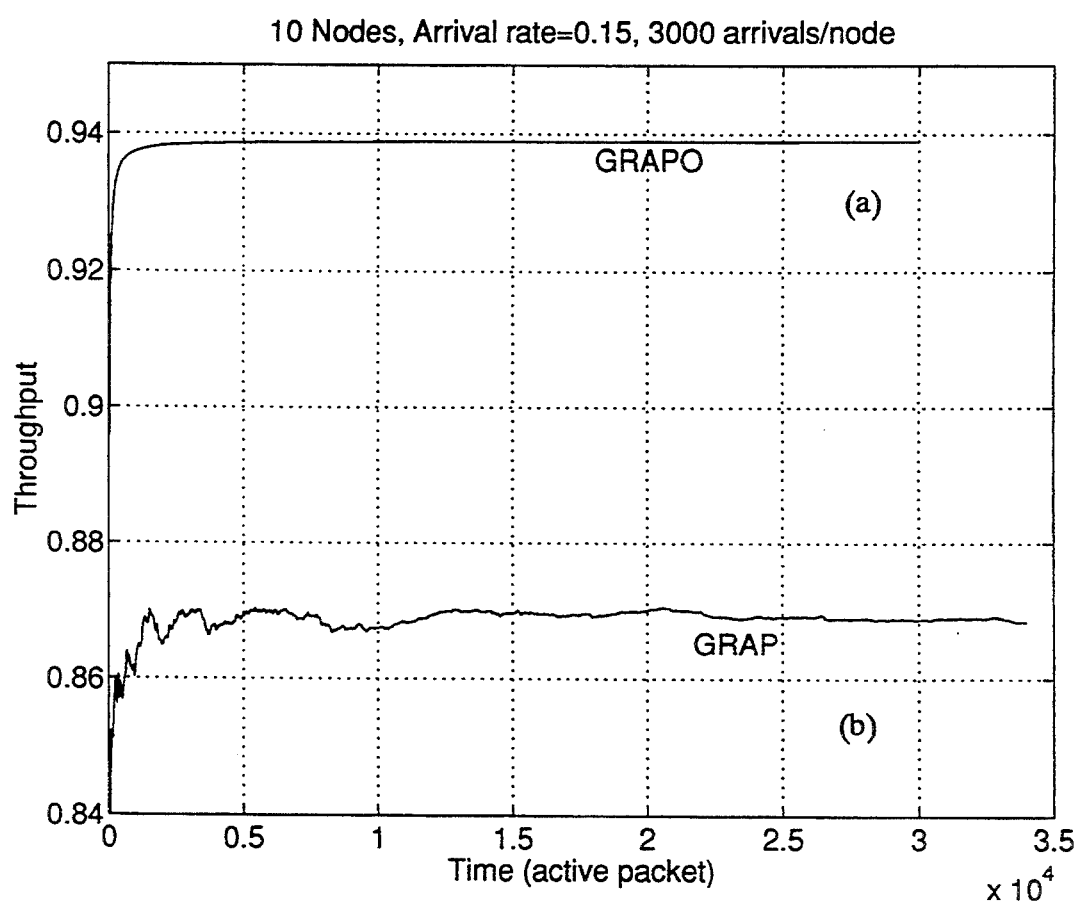
FIG. 3 contains curves 3a and 3b, which are the plots of throughput as a function of arrival rate measured in Example 1 and Comparative Example 1, respectively.

A wireless LAN consisting of one base station and 10 nodes is established. The arrival rate is set at 0.15 per node, with 3,000 arrivals at each node. Each node is assumed to have exactly one packet to be transmitted. The throughput of the process using the method disclosed in the present invention is measured, with the result shown in FIG. 3a. Example 1 indicates excellent throughput ($>0.90$) and convergence using the method disclosed in the present invention.

EXAMPLE 2

Figure 4:
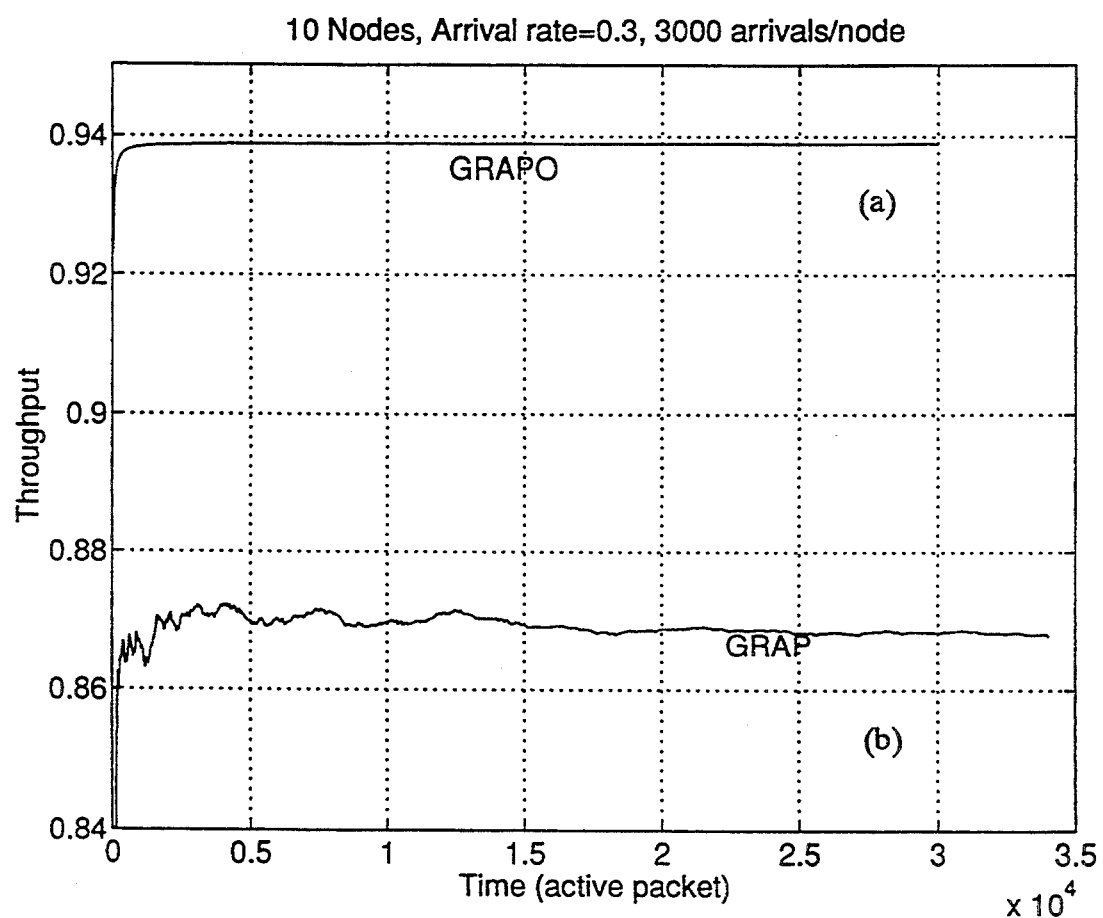
FIG. 4 contains curves 4a and 4b, which are the plots of throughput as a function of arrival rate measured in Example 2 and Comparative Example 2, respectively.

The system is identical to that described in Example 1, except that the arrival rate is set at 0.3. The throughput of the process using the method disclosed in the present invention is measured, with the result shown in FIG. 4a. Example 2 also indicates excellent throughput ($>0.90$) and convergence using the method disclosed in the present invention.

COMPARATIVE EXAMPLE 1

The system is identical to that described in Example 1, except that the value Q is set to be equal to P, and the collided users remain in group $G_i$ and join the repolling immediately right at the end of $G_i$ until all collisions are resolved. The throughput of the process using the modified method measured, with the result shown in FIG. 3b.

COMPARATIVE EXAMPLE 2

The system is identical to that described in Example 2, except that the value Q is set to be equal to P, and that

TABLE 1

| Superframe | Active User [User (Group No.)] | Group (User/Random Address) | | | Collided Users |
|---|---|---|---|---|---|
| | | $G_0$ | $G_1$ | $G_2$ | |
| 1 | A(0), B(1), C(1), D(2), E(2), F(1) | A/3 | B/2, C/1, F/1 | D/2 | C, F |
| 2 | G(0), C(1), B(1), F(2), D(2) | G/3 | B/2, C/3 | F/4, D/2 | None |
| 3 | A(0), B(1), C(1), G(2), E(2) | A/3, G/3 | B/2 | E/0 | A, G |
| 4 | A(0), B(1), C(1), G(2), E(2) | A/2 | B/2, C/3 | E/0, G/3 | None |
| 5 | L(0), B(1), I(1), K(2), E(2) | L/1 | B/2, I/2 | E/0, K/1 | B, I |
| 6 | A(0), L(0), B(0), C(1), G(2) | A/2, B/4, L/1 | C/3 | G/3 | None |
| 7 | A(0), B(0), L(0), C(1), F(1), I(1), D(2), E(2), G(2), K(2) | A/2, B/4, L/1 | C/3, F/4, I/2 | D/2, E/0, G/3, K/1 | None |

Typically, an appropriate value of P is first selected for a LAN, and the choice of Q, which is less than or equal to P is determined. Preferably, the value of Q is dynamically changed according to the system load. The method disclosed in the present invention has shown excellent convergence behavior and high throughput/delay performance.

the collided users remain in group $G_i$ and join the repolling immediately right at the end of $G_i$ until all collisions are resolved. The throughput of the process using the modified method measured, with the result shown in FIG. 4b.

EXAMPLES 3-5

Figure 5A:
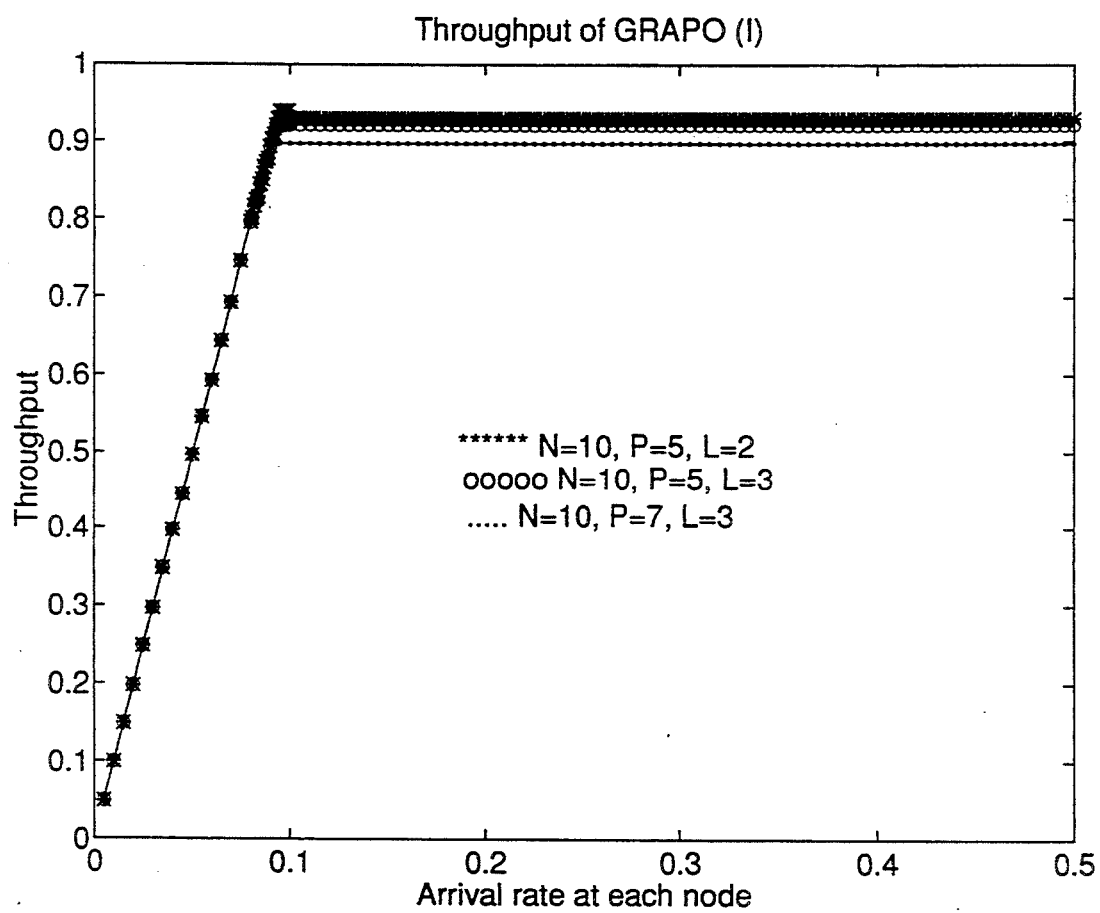
FIGS. 5a and 5b are the plots of throughput and delay, respectively, as functions of arrival rate measured in Examples 3 through 5.

In Examples 3 through 5, a wireless LAN contains one base station and 10 nodes is established, and the random numbers are selected from 0 to 4 (i.e., P=5) for Examples 3 and 4, and from 0 to 6 (i.e., P=7) for Example 5. The throughputs using the method disclosed in the present invention are measured as a function of arrival rate and the results are plotted in FIG. 6a. In Example 3, two random numbers (i.e., L=2) are generated and transmitted; whereas in Examples 4 and 5, three random numbers are generated, although only random numbers are used in the polling process in all the three cases. FIG. 5a shows that very little difference is observed from these three cases. The throughput for Example 5 is actually slightly lower than either Example 3 or 4.

Figure 5B:
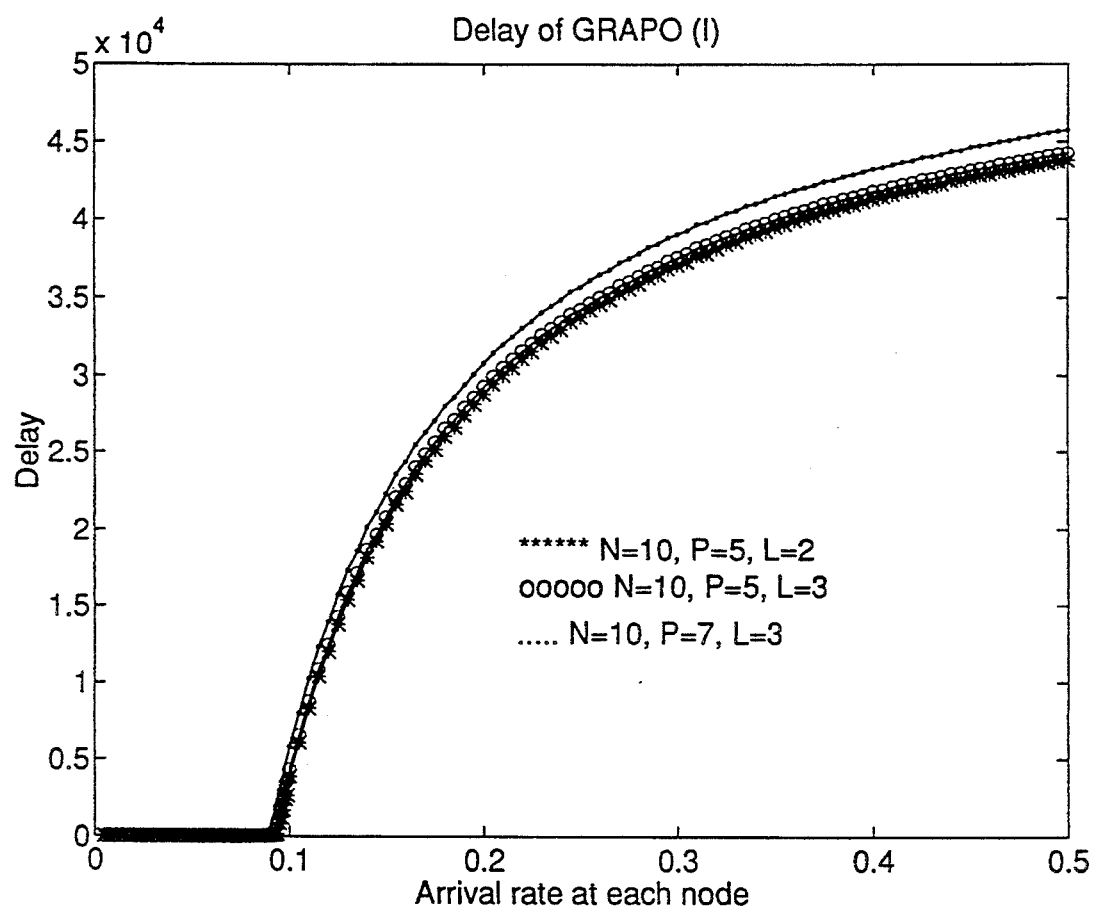

The measured delays for all the three examples are shown in FIG. 5b. Delay is defined as the average time from a packet being generated until it is successfully transmitted. FIG. 5b also shows little difference in the measured delays among the three Examples, but the delay is slightly higher for Example 5.

EXAMPLES 6-8

Figure 6A:
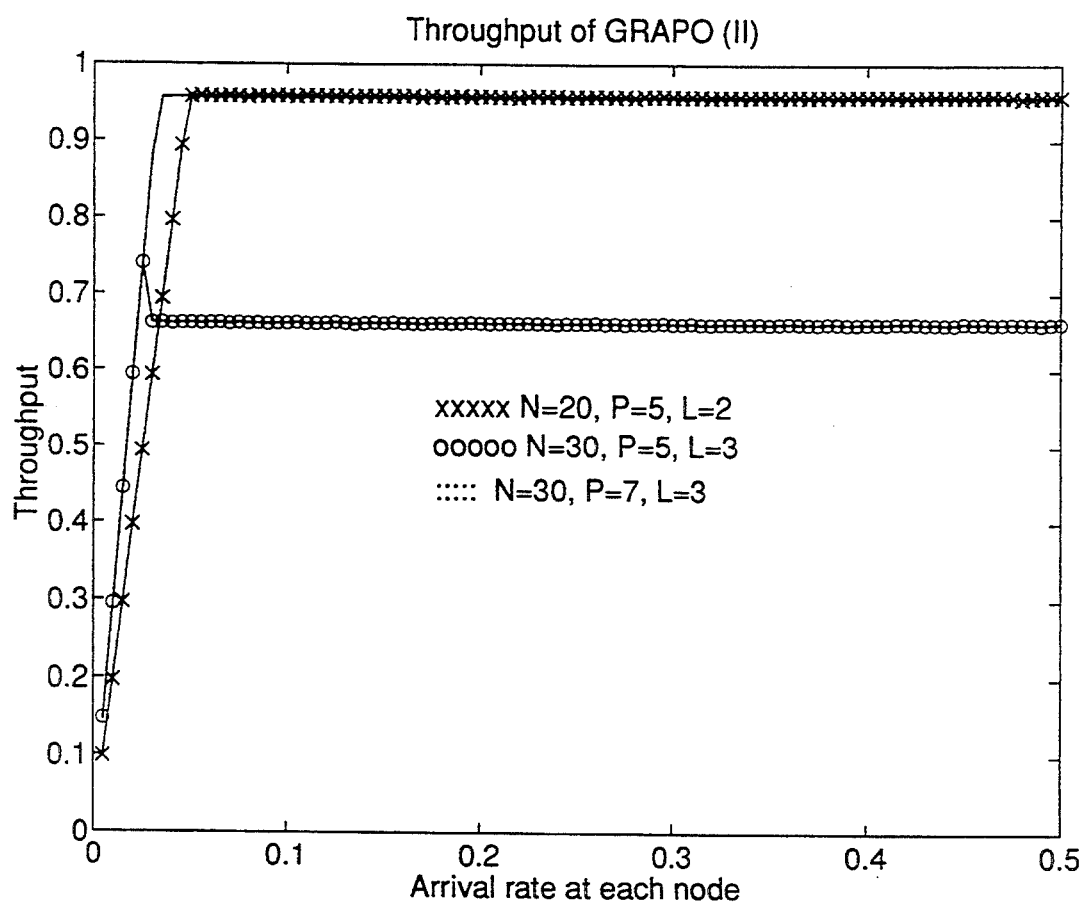
FIGS. 6a and 6b are the plots of throughput and delay, respectively, as functions of arrival rate measured in Examples 6 through 8.
Figure 6B:
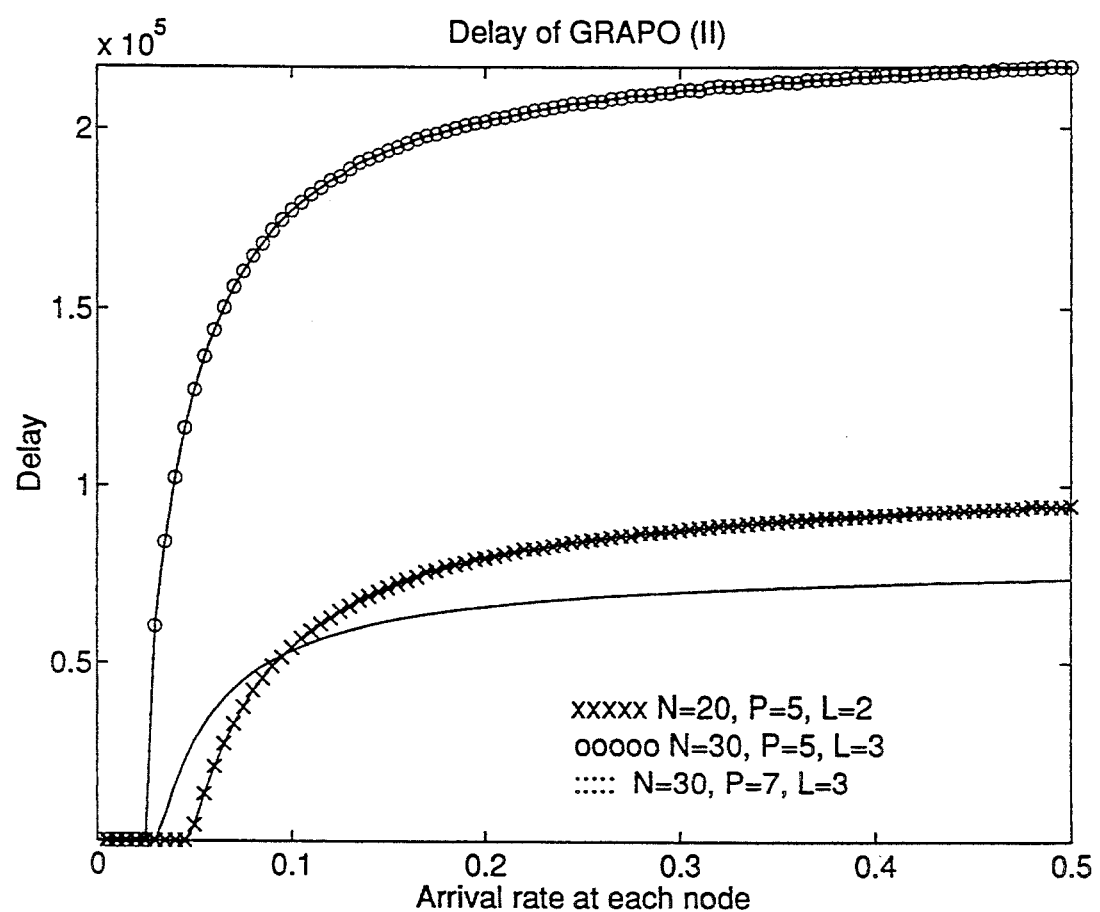

Examples 6 though 8 are identical to Examples 3 through 5, except that number of nodes is increased from 10 to 20 in Example 6, and from 10 to 30 in Examples 7 and 8. The throughput and delay measured from the three Examples are shown in FIGS. 6a and 6b, respectively. It is shown that the increased node number can be compensated by increasing the value of P.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. In a wireless local area network comprising a base station and a plurality of mobile nodes, a method to provide a medium access control protocol, said method comprising the following steps:
   (a) pre-arranging a polling cycle to be broadcast from said base station into a sequence of Q broadcast groups, identified as groups 0 through Q-1, wherein Q is an integer, each broadcast group being considered as a sub-polling cycle;
   (b) for those mobile nodes that have not been assigned to a fixed group address, assigning each mobile node intending to send at least a packet of data to said base station to a randomly chosen broadcast group I, wherein I is an integer from 0 to Q-1;
   (c) starting from broadcast group 0 through broadcast group Q-1, performing a group randomly addressed polling as follows: within each broadcast group I, performing a randomly addressed polling procedure comprising the following steps:
      (i) broadcasting a first broadcast message from the base station to all mobile nodes under its coverage to signal a ready to receive at the base station from mobile node assigned to broadcast group I;
      (ii) for those mobile nodes that have not been assigned a fixed random number, generating a first random number R in each mobile node belonging to broadcast group I, said first random number being selected from a set of numbers ranging from 0 to P-1, wherein P is an integer greater than or equal to Q;
      (iii) simultaneously transmitting said first random numbers Rs from all active mobile nodes belonging to said broadcast group I to said base station;
      (iv) collecting said first random numbers Rs at said base station and separating said mobile nodes into collided nodes and uncollided nodes, collided nodes being defined as those active nodes that transmitted a common random number with at least another node;
      (v) transmitting said at least one packet of data from each of said uncollided mobile nodes to said base station;
      (vi) assigning each of said uncollided mobile nodes to a fixed group address, each of said uncollided mobile nodes also being assigned a fixed random number which is its originally transmitted random number;
      (vii) repeating steps (c)(i) through (c)(vii) for all the broadcast groups;
   d) assigning each of said collided mobile nodes from previous step and all newly active mobile nodes, except those that have been assigned to a fixed group address, to a randomly chosen broadcast group;
   (e) performing a group randomly addressed polling by repeating steps (c)(i) through (c)(vii) for all said broadcast groups; and
   (f) repeating steps (d) and (e) if there exist collided and/or newly active mobile nodes.

2. The method to provide a medium access control protocol for a local area network according to claim 1, wherein said number of groups Q is a variable which is subject to change from one polling cycle to another.

3. The method to provide a medium access control protocol for a local area network according to claim 1, wherein said packet of data contains time-bounded data.

4. The method to provide a medium access control protocol for a local area network according to claim 1, wherein said mobile node transmits at least two of said first random numbers in step (c)(ii).

5. The method to provide a medium access control protocol for a local area network according to claim 1, wherein said local area network comprises at least ten mobile nodes and said first random numbers are selected from a group of integers from 0 to less than 5.

6. The method to provide a medium access control protocol for a local area network according to claim 1, wherein said local area network comprises at least twenty mobile nodes and said first random numbers are selected from a group of integers from 0 to less than 6.

7. The method to provide a medium access control protocol for a local area network according to claim 1, wherein said local area network comprises at least thirty mobile nodes and said first random numbers are selected from a group of integers from 0 to 6.

* * * * *